United States Patent
Gillespie (10) Patent No.: US 9,828,014 B1
(45) Date of Patent: Nov. 28, 2017

(54) SHOPPING CART CLAMP-AND-CONCEAL STEPPING STOOL

(71) Applicant: Jan Gillespie, Martinez, CA (US)

(72) Inventor: Jan Gillespie, Martinez, CA (US)

( * ) Notice: Subject to any disclaimer, the term of this patent is extended or adjusted under 35 U.S.C. 154(b) by 0 days.

(21) Appl. No.: 15/448,559

(22) Filed: Mar. 2, 2017

(51) Int. Cl.
| | |
|---|---|
| *B62D 39/00* | (2006.01) |
| *B62B 5/00* | (2006.01) |
| *B62B 3/02* | (2006.01) |
| *B62B 3/14* | (2006.01) |
| *E06C 5/00* | (2006.01) |

(52) U.S. Cl.
CPC ............... *B62B 5/00* (2013.01); *B62B 3/02* (2013.01); *B62B 3/14* (2013.01); *E06C 5/00* (2013.01)

(58) Field of Classification Search
CPC .. B62B 5/00; B62B 5/08; B62B 5/085; B62B 5/087; B62B 3/00; B62B 3/02; B62B 3/14; B62B 3/022; B62B 3/027; B62B 3/1472; B62B 4/1476; B62B 3/148; B62B 3/1484; E06C 5/00; E06C 5/02; E06C 5/04; E06C 5/24
See application file for complete search history.

(56) References Cited

U.S. PATENT DOCUMENTS

| | | | | |
|---|---|---|---|---|
| 1,213,251 A | * | 1/1917 | Pierce | B62B 3/02 280/47.35 |
| 2,657,936 A | * | 11/1953 | Fabel | B62B 3/04 280/166 |
| 2,797,102 A | * | 6/1957 | Adams | B62B 3/02 220/485 |
| 3,834,726 A | * | 9/1974 | Hobza | B62B 5/0026 280/32.7 |
| 4,096,920 A | * | 6/1978 | Heyn | B62B 5/0026 180/11 |
| 4,190,280 A | * | 2/1980 | Donohoe | A61G 1/04 280/32.7 |
| 4,610,454 A | * | 9/1986 | Gill | B62B 3/18 182/15 |
| 4,652,003 A | * | 3/1987 | Karashima | B62B 5/00 182/127 |
| 4,758,007 A | * | 7/1988 | Reck | E06C 5/02 182/127 |
| 6,575,480 B2 | * | 6/2003 | McKelvey | B62B 3/144 280/33.993 |
| 8,152,177 B1 | * | 4/2012 | Johnson | B62B 3/18 280/33.992 |

(Continued)

*Primary Examiner* — James M Dolak
(74) *Attorney, Agent, or Firm* — Foundation Patents, LLP; Richard Bennett Salles (57) ABSTRACT

The present invention is a uniquely-engineered stepping stool that elegantly connects to a shopping cart via a double-socket C-clamp. The invention features "kick up legs" with an arched crossbar for a shopper's foot and a double-socket C-clamp comprising square-shaped polyurethane memory foam teeth along its inner apertures to connect to a shopping cart's rear bottom bar. The uniquely engineered C-clamp acts as a hinge, allowing the shopper to rotate the stool around a shopping cart's rear-base bar to easily stowe the stool along the shopping cart's bottom base rack or to stowe the stool against the cart's rear wall. The clamp is also engineered to easily detach from the cart so the stool may be used independently. The stool has channels and torsion springs in its undercarriage so the legs fold up into the stool's housing, forming a single, portable unit.

7 Claims, 8 Drawing Sheets

(56) References Cited

U.S. PATENT DOCUMENTS

| 8,287,042 B1* | 10/2012 | Schimmeyer | A47D 1/10 |
| | | | 297/217.7 |
| 2006/0145436 A1* | 7/2006 | Varricchio | B62B 3/14 |
| | | | 280/33.992 |

* cited by examiner

SHOPPING CART CLAMP-AND-CONCEAL STEPPING STOOL

FIELD OF THE DISCLOSURE

The invention is a stepping stool fashioned to clamp onto, and to fit up against or into, a standard shopping cart (or similar storage-vehicle such as a rolling baby carriage) to transport goods and sundries.

BACKGROUND

Shopping carts with internal baskets are used widely in supermarkets, department stores and in open markets. Shopping carts generally comprise front wheels attached to a base via a caster assembly positioned on a pivoting shaft so the customer may turn the cart by applying a gentle forward force on the handgrip. The rear wheels usually roll solely forward on an axle parallel to that of the front shaft.

Stepping stools are commonly found within supermarkets, but are rarely found inside, or connected to, the shopping carts that are readily available to customers. Therefore, customers who can't easily reach the "top shelf" must usually call for assistance.

Items on the "top shelf" of common supermarkets are surprisingly not totally out of reach, and usually require a stepping stool raised only to 6-10". Stepping stools are customarily small and low enough to the ground to be fully utilized used in a single step (usually making multi-step stools unnecessary).

While folding step ladders are taller, they are generally too bulky to effectively fit inside a shopping cart, and also too large to lay flat against the shopping cart's base (base-rack). Step ladders are also too bulky to effectively "clamp and conceal" within a shopping cart.

Some supermarkets offer folding hand trucks featuring dolly configurations, optionally offering a dolly coupled to the cart's front frame. Unfortunately, these hand trucks can be used only to transport large items, and they do not help the typical customer who simply needs an "easy pull-out step stool" to reach top-shelf items.

The present invention allows the customer to "fold out" the step stool from its "stored-position" (collapsed, folded and resting flush with the back of the shopping cart OR fully collapsed and resting atop/along the cart's base rack), then fold out the "kick-up legs" with arched connecting bar. The "kick up legs" feature rubber-type stoppers for braking-and-anchoring against the store floor, then [after using the stool to reach their desired item] lifting the "kick-up legs" with their uniquely-arched connecting bar; then the customer may alternatively "rotate-up" the stool back to its stored position by rotating/turning the stool around the cart's rear-side base bar using the stool's uniquely-designed "foam-teeth C clamp," as a hinge, or the customer may alternatively un-clamp the stool from the cart with a relatively gentle pull, then fold-up the kick-up legs, then lay the entire stool [now flat like a folding table in its fully-collapsed-state] flat against the cart's base bottom rack.

The stepping stool's utility is enhanced by its portability between the base of the shopping cart, the floor, and [by easily unclamping] use anywhere else the customer wishes to use it (even at home). The stool therefore goes wherever the shopping cart goes, and the customer can unfold-&-rotate it out again for future use.

BRIEF DESCRIPTION OF THE DRAWINGS

FIG. 1 shows the invention with the step stool in its deployed "stool" position.

DEFINITIONS

C-Clamp: Means for detachably engaging the stepping stool with the shopping cart. The preferred embodiment is a "double socket C-clamp," which has two apertures to engage and hold either a smaller or a larger shopping cart rear base rod. While most C-clamps have tightening screws, the C-clamp of the instant invention features "memory foam teeth," which effectively secure the stool to the cart without requiring a tightening screw. The remainder of the clamp may be steel or cast iron, as in generic workshop C-clamps.

Double-socket C-Clamp: a C-clamp with two apertures for holding larger or smaller items in one of its two apertures.

Foam-style teeth: The teeth of the C-clamp, which have similar density and viscosity to polyurethane memory foam, but may be comprised of any substance that safely grips and detaches from a shopping cart bar by simply applying force (without the need for screws or additional fastening means).

Indented Groove: the beveled recess of the stool's housing unit's top, wherein the padded mat rests, also called the "recessed top tray region."

Nonslip stopper: An anti-skid gripper pad, customarily comprised of rubber. This is the tread portion of the cart's proximal legs' bottoms. These stoppers provide braking means for the shopping cart when a shopper places her weight on the stepping stool's top mat-platform.

Padded mat: the top piece of the stool which forms its planar platform for stepping. The mat is comprised of a nonslip anti-skid padding, customarily rubber. The mat may further comprise "bots dots" for further anti-skid functioning. "Padded" is herein a colloquial term for the top nonslip surface; no additional soft or pneumatic pad is necessary.

Standard Shopping Cart: A generic "supermarket" shopping cart with a storage area customarily comprised of a relatively narrow front [distal] end, a relatively wide rear [proximal] end, and wheel base with a rear bottom bar (also called the rear bottom cross bar) near the shopper's feet. The rear bottom cross bar is customarily a metal rod which supports the shopping cart's rear wheel struts.

"Top shelf": herein used only colloquially; the stool is useful any time a shopper wishes to reach an item higher than shoulder-level. The stool may be used for any purpose for which step stools are needed.

Torsion Spring: a spring that works by twisting such that, when force is applied, its stored mechanical energy is converted to kinetic energy moving an object around a torsion bar or coil.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)

–(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. §112, paragraph 6. Specifically, the use of "step of" in the claims herein is not intended to invoke the provisions of U.S.C. §112, paragraph 6.

In all embodiments, when the customer wants to use the stool, it can be rotated, or "flipped," into position by merely grabbing the proximal "kick up legs," with one's foot and pulling upward-and-outward so that the entire stool pivots, or rotates, around the cart's rear-base-bar using the C-clamp as a hinge. The stool is deployed, or "rotated-out" until the slide-resistant floor pads on bottom of each leg are flush with the floor. The non-slip floor pads also function as a cart-brake to further secure customer safety.

The top standing-platform (pad, mat) of the stool will then be parallel with the floor, and the customer may stand on it to reach desired "top shelf" items. The stool's top platform comprises a textured surface which increases friction and prevents customer sliding, even with particularly slippery shoe soles or with bare feet.

In the preferred embodiment, the legs are held into the stool by individual tension springs, or herein "torsion springs," positioned inside spring housings by hooks and correspondingly-positioned foldable joints, wherein the joints are hinges which further "lock" the legs inside their corresponding housing channels when legs are so folded-inside. Each tension spring housing comprises a hook which holds each corresponding spring. When the each spring lifts its corresponding leg into its housing channel, the leg, when buttressed against the edge of each channel in the housing, locks the legs in place.

The C-clamp at the end of the legs comprises a memory foam (thermoplastic foam) so it can adapt to a spectrum of shopping cart rear-lower cross bar sizes and diameters. The foam allows for easy clamping and removal, as does the "double C-clamp" shape, which easily allows for engagement with both large and small diameter shopping-cart rear lower cross bars. The teeth, in the preferred embodiment, are substantially square shaped, for their unique ability (when comprised of thermoplastic foam) to hold and disengage from an object (herein a cart rod) with the application of minimal force.

The slip resistant tread atop the stool platform is its own piece, a padded mat with treaded top and comprising a series of connecting pegs along its bottom side. The T-shaped-pegs along the tread mat's bottom side, are positioned into the top of the stool by manually "popping them in" to their connecting sockets/recesses within the top of the stool's housing unit. The housing unit has an upper lip, or grooved, indented recessed region, in which the upper tread mat pad rests.

Figure 1:
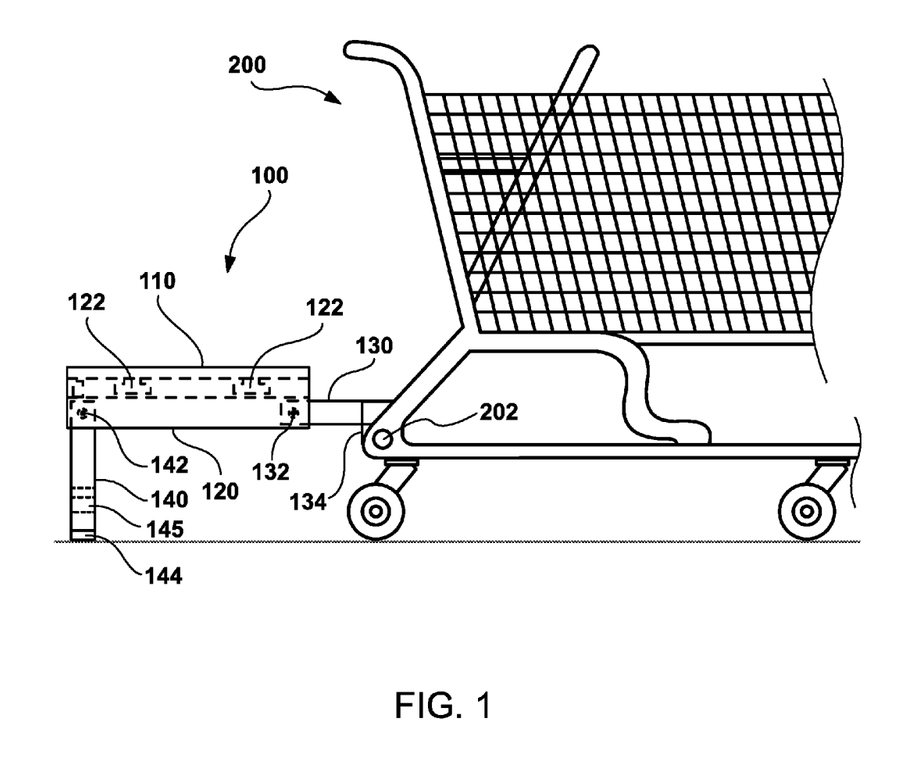
FIG. 1 is a side-profile views of the preferred embodiment.

FIG. 1 depicts an embodiment of the invention 100 in its "rotated-out," deployed anchored "unfolded" position, ready for the shopper to step on the upper platform tread 110 to reach the "top shelf." The front, proximal legs 140 and rear, distal legs 130 have been deployed into their locked position. Rubber stoppers 144 at the end of the proximal legs 140 grip the ground. Inside the housing unit 120, legs 130, 140 lock into the housing 120 by torsion springs 124 affixed to the housing 120 by hooks (not shown). The legs 130, 140 are pulled by the torsion springs 124 up into the housing channels 123 along leg hinges on a horizontal axle (not shown).

The unit 100 has a non-slip tread 110, which is anchored to the unit via 120. The C-clamp 132 is clamped to the shopping cart's lower-rear cross bar 202.

Figure 2A:
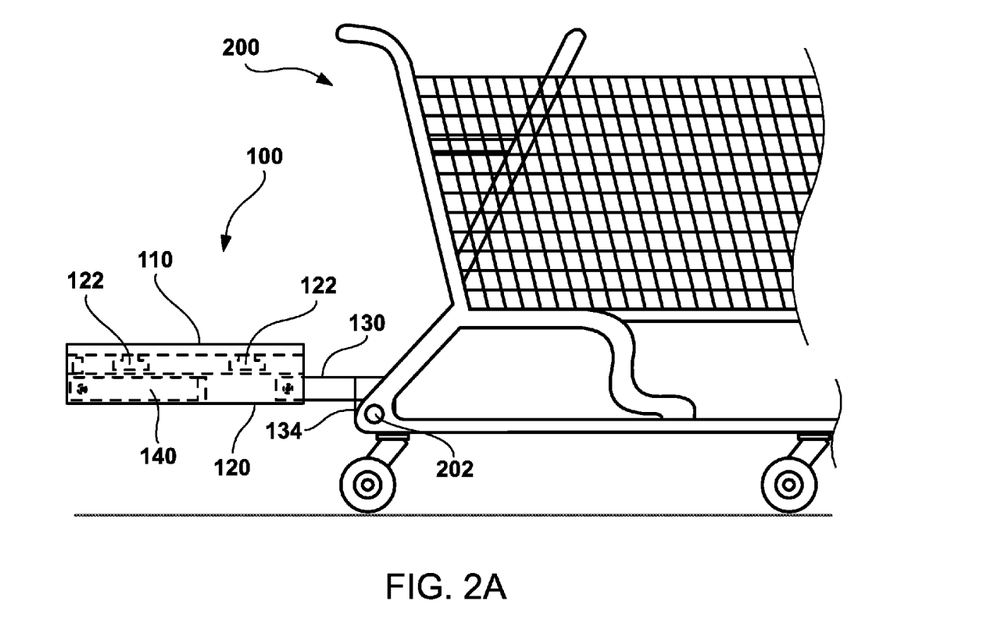
FIGS. 2A and 2B shows the invention with the step stool in its partially-folded state, ready to be stored.
Figure 2B:
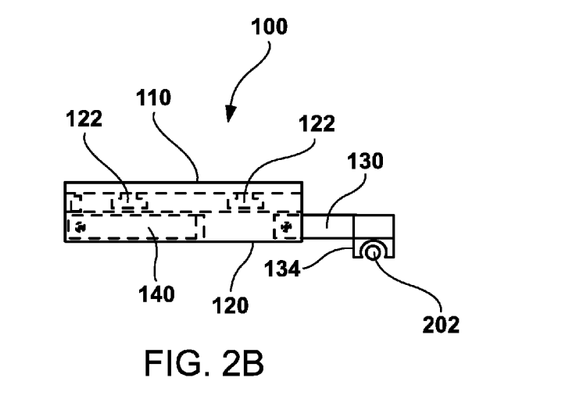

FIG. 2A and FIG. 2B depict an embodiment of the invention in process of being folded and stowed. The proximal legs 140 are shown folded up into their channels 123. The tread plugs 112, herein shaped substantially as "upside down capital T's," fit into their corresponding housing sockets 122, or recesses, to hold the tread pad 110. The distal legs 130 clamp 134 onto the shopping cart's bottom-rear cross bar 202. The clamp 134 may also comprise a truss screw mechanism to attach the stool to the shopping cart in a more permanent fashion.

Figure 3A:
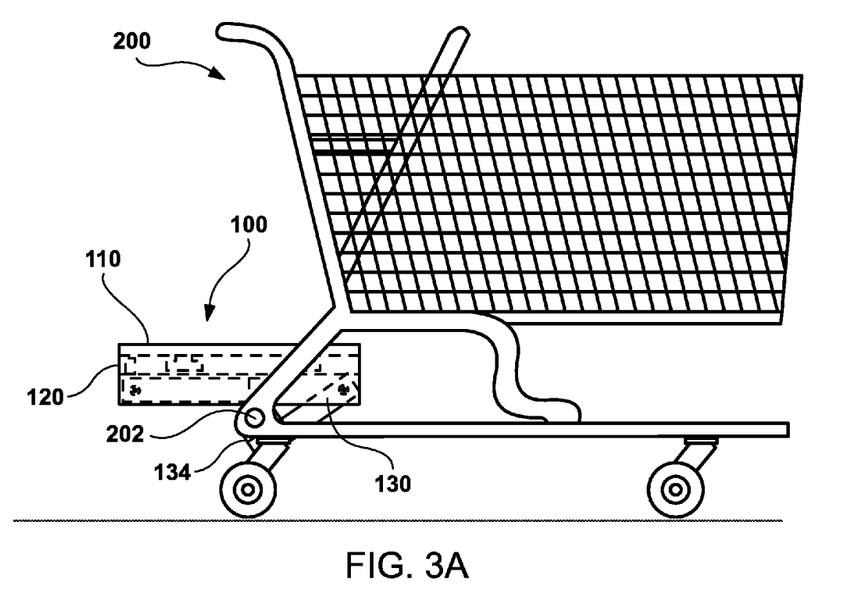
FIG. 3A shows the invention in its intermediary "crunched" position, wherein the shopper has pushed the partially-folded stool toward the cart, and may now choose between "rotating it up" against the back of the cart, or further "crunching" the stool until it rests along the cart's bottom rack, or de-clamping the stool so it may lie (unattached) across the cart's bottom rack.
Figure 3B:
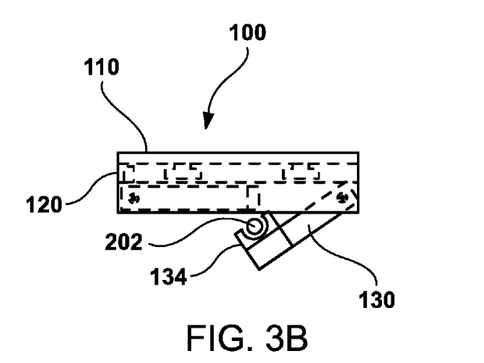
FIG. 3B shows the duplicate view as FIG. 3A without the shopping cart.

FIGS. 3A and 3B show the same embodiment of the invention in the "next" stage of folding/stowing. The distal legs 130 are herein shown further folded/folding up into the housing 120. The shopper (not shown) has already folded the proximal legs 140 into the housing 120, and the bulk of the unit 100 is in an intermediary stage, shown largely stowed between the cart's 202 base rack 204 and the cart's main container area.

Figure 4A:
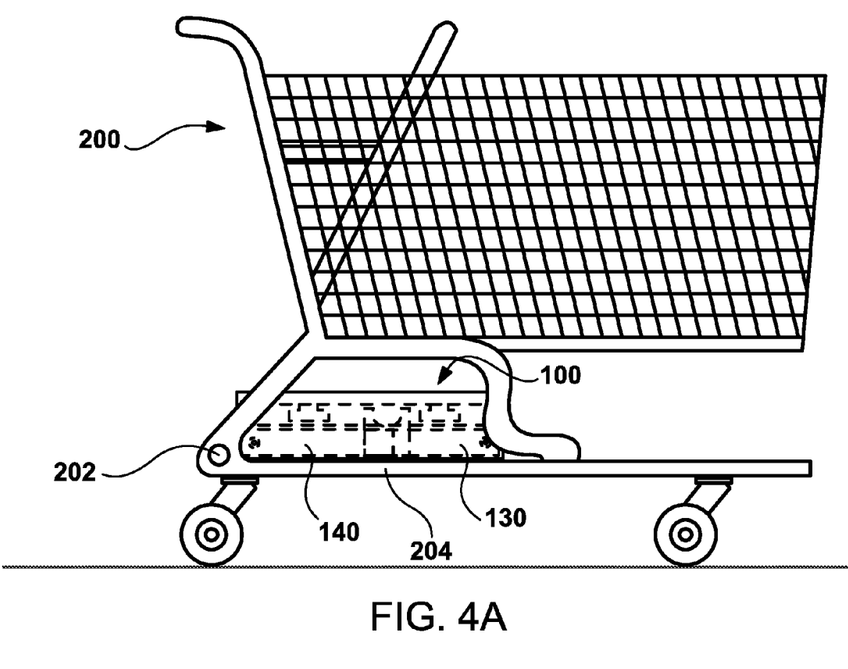
FIGS. 4A and 4B show the invention in its completely collapsed/folded state, either connected to the cart's back rear bar or laying (attached or unattached) along the cart's base rack.

FIG. 4A shows the cart stowed (in this embodiment) completely stowed horizontally on the cart's base bottom rack 204. If the cart is large enough (offering sufficient space between the base bottom rack 204 and the main cart container area, then the shopper need not "de-clamp" the clamp 134 from the cart's lower-rear cross bar 202 to achieve this stowing state. After stowing the proximal legs 140, if the shopper continues to push the invention forward [toward the cart] in this scenario, the unit 100 will fit entirely in the open region above the cart's base bottom rack 204.

The shopper can alternatively achieve this 'fully stowed' state by easily de-clamping the C-clamp 134 from the cart's lower-rear cross bar 202. The Clamp's unique shape and features allow for this ease of de-clamping (shown in FIG. 7).

Figure 4B:
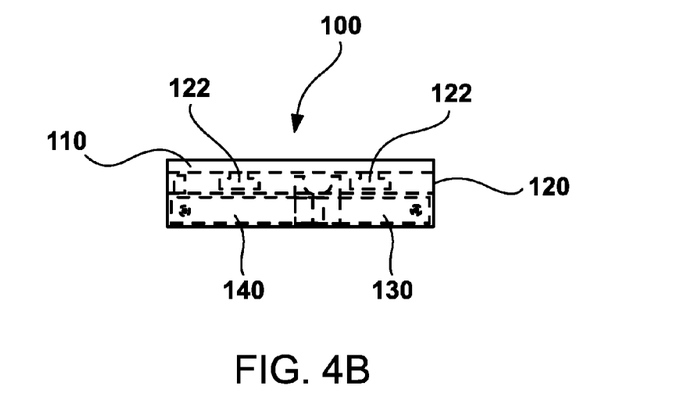

FIG. 4B shows the unit "as collapsed" in a simple, easily-stowed rectangular shape, with legs 130, 140 stowed into the unit's 100 housing 120, said legs being fixed into their corresponding channels 123.

Figure 5A:
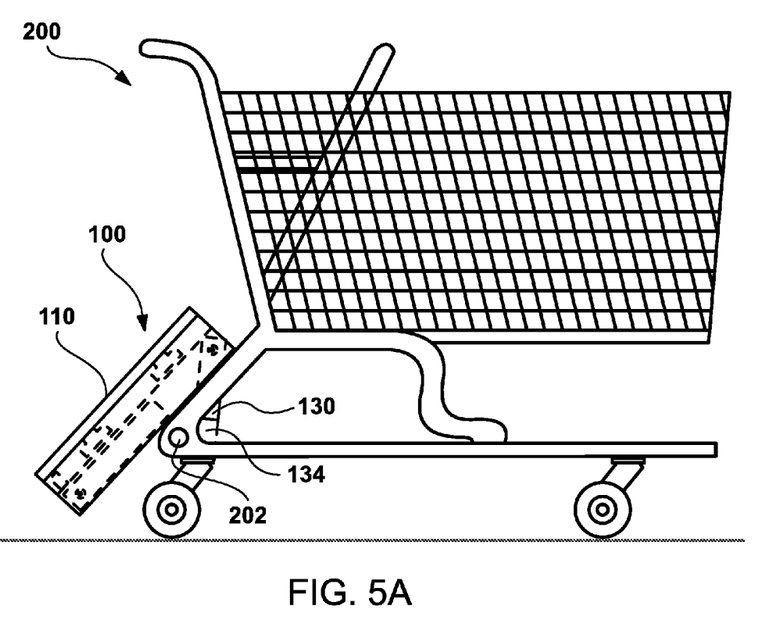
FIGS. 5A and 5B show the preferred embodiment of the invention stowed up/against the rear of the cart.

FIG. 5A shows a temporary positioning of the unit 100 if the shopper wishes to continue shopping and does not wish to completely stow the unit 100. Herein shown, the front legs 130 of the unit 100 are only partially folded, allowing the unit 100 to remain diagonally positioned against the cart's rear bars, yet sufficiently off the floor to allow the shopper to continue rolling the cart without encumbrance to continue shopping. When the shopper wishes to reach another "top shelf" item, she can simply grab the proximal bottom corner of the unit 100, grab and pull down/out the kick out legs 140 by their arched connecting bar 145 (the "kick up lip,") until said legs are fully extended in their locked, deployed position, then drop said legs 140 and their rubber stoppers 144 against the floor, and then step on the stool as needed. The radius of the arched connecting bar 145 must be sufficient to accommodate at least a human toe and at most a large human foot, therefore between 3 inches and 14 inches.

Figure 5B:
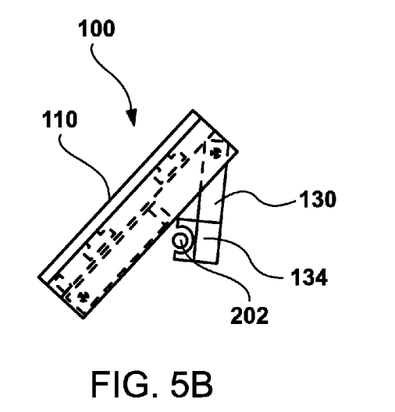

FIG. 5B shows the angle of the distal legs 130 and their maintained-connection to the cart's lower-rear cross bar 202. The C-clamp 134 is uniquely shaped and engineered to maintain this connection while rotating into the position shown, allowing for secure storing while the shopper continues to roll the cart.

Figure 6:
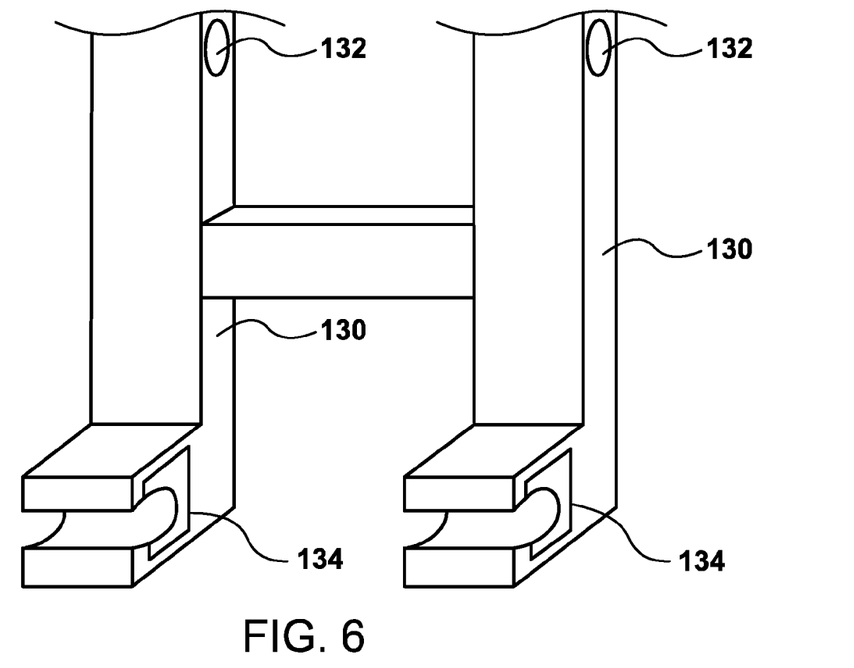
FIG. 6 shows an enlarged rear, inverted view of the invention 100's distal legs 130 and C-clamps 134.

FIG. 6 shows a close-up view of the distal legs 130. The hinge & axle points 132 are herein generically shown, referencing the position where necessary spring, hinge and axle are positioned. The unique C-clamp 134 is also shown, further enlarged in FIG. 7.

Figure 7:
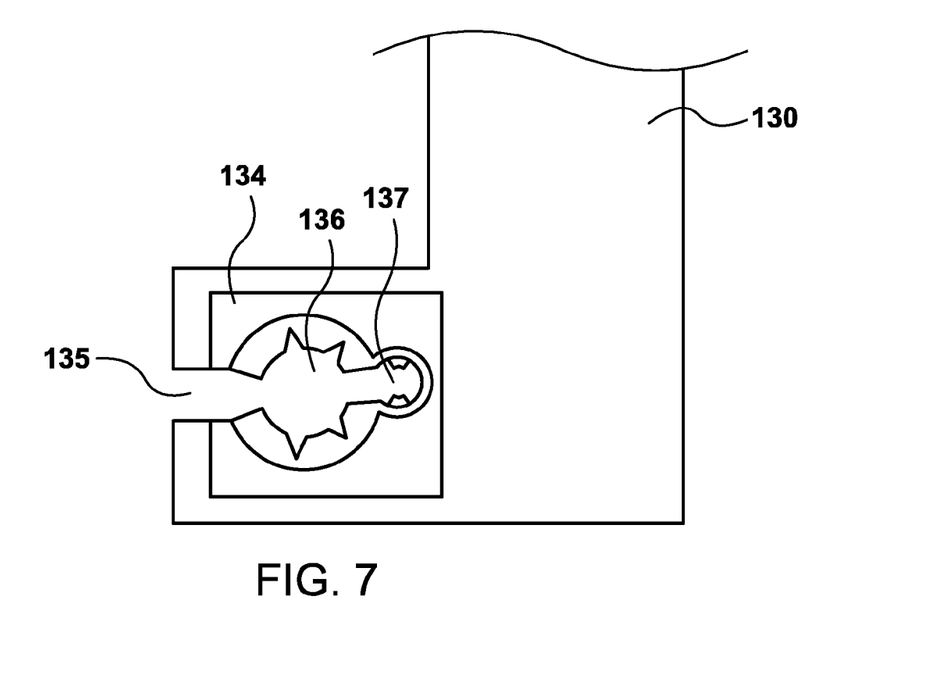
FIG. 7 shows an enlarged side view of the unique foam "double-socket" C-clamp of the preferred embodiment of the invention.

FIG. 7 shows the C clamp in one embodiment of the invention. The distal legs' 130 clamps 134 fit over the cart's lower-rear cross bar 202 via the clamp's 134 aperture 135. The clamp 134 thus snaps over larger cross bars 202, which rest in the clamp's 134 larger socket 136. Smaller cart cross bars 202 (bars with more narrow diameters) therefore snap into the clamp's 134 smaller socket 137.

Figure 8:
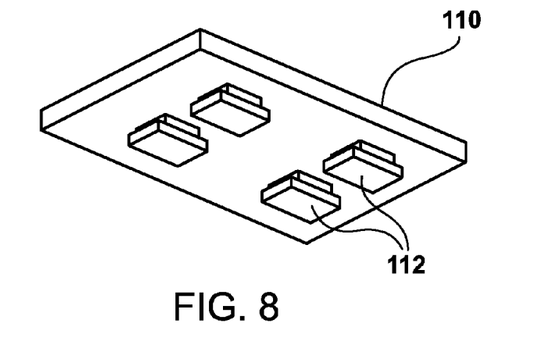
FIGS. 8 and 9 show an aerial perspective view of the invention's housing unit, non-slip pad mat, and an underside, inverted view of the padded mat plugs and sockets for positioning, and the grooved indentation in the housing to receive the padded mat. In the embodiment shown, the housing unit's top side features a recessed area with socket spaces wherein the corresponding padded mat's plugs fit. The top area of the housing unit is generally "tray shaped," to allow for positioning of the padded mat.
Figure 9:
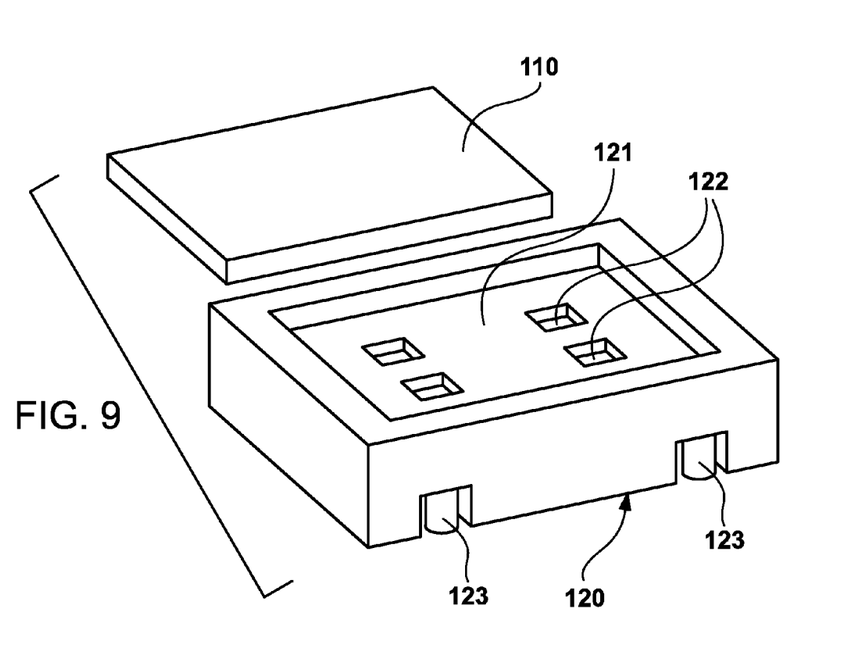

FIGS. 8 and 9 show the non-slip mat pad 110 and its 110 connecting plugs 112, which fit into their corresponding housing 120 sockets 122. The entire pad 110 fits into an indentation in the main housing 120, sufficiently recessed to securely hold the pad 110. The undercarriage of the housing 120 is also vaguely shown, generally indicating the channels 123 wherein the legs 130, 140 retract and remain positioned when fixed. Inside the housing channels 123 are folding joint fastening means which connect the legs 130, 140 to the housing 120. In the preferred embodiment, the folding joint fastening means comprise hooks, tension springs, and hinges positioned to help the legs 130, 140 fold up into the housing 120 with a minimal amount of force applied.

Figure 10:
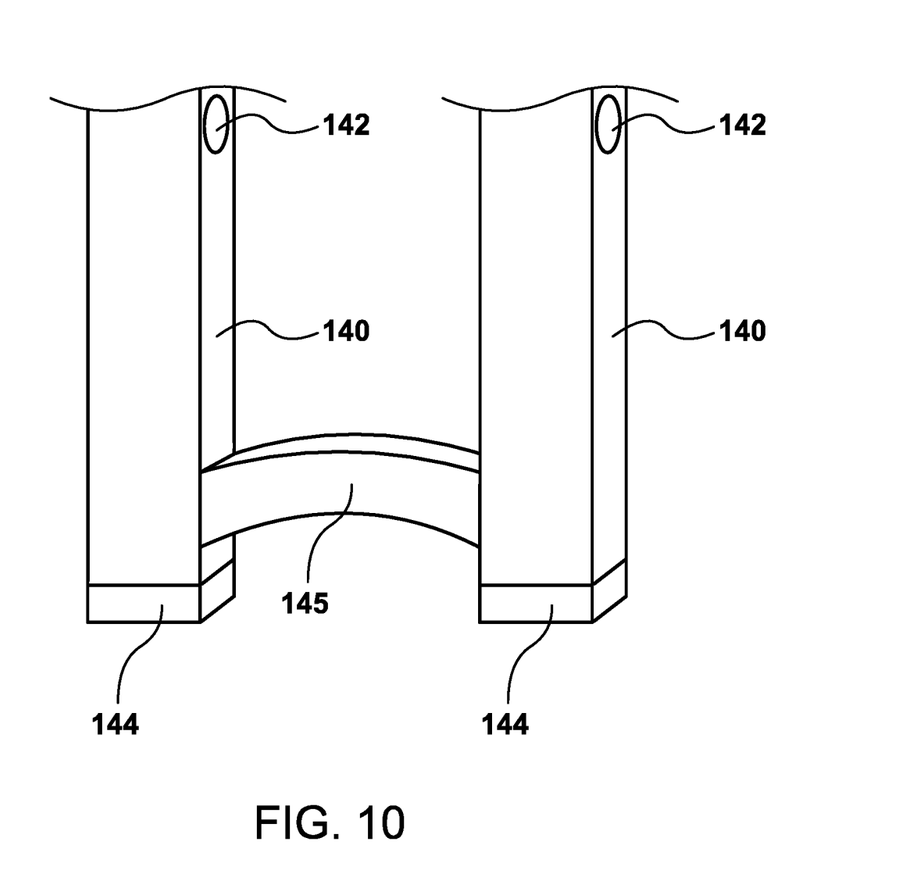
FIG. 10 shows an enlarged rear, inverted view of the invention 100's proximal "kick up legs" 140 with arched connecting bar 145, or "kick up lip."

FIG. 10 shows a close-up view of the proximal legs 140. The hinge & axle points 142 are herein generically shown, referencing the position where necessary spring, hinge and axle are positioned. The unique arched cross bar 145 is featured, used as a "kick up lip" by the shopper to collapse the invention into its "stowed" state.

ALTERNATE EMBODIMENTS

The stool may also clamp permanently to the shopping cart via Truss-type clamp, with screws to more-permanently fix the stool to a shopping cart or supermarket shelf.

The C-clamp may also feature a slide-cover which makes it interchangeable with the "kick up legs," thereby allowing the shopper to use the stool anywhere (without the shopping cart anchor).

The C-clamp may also comprise its own rubber stoppers along its outer edge, so that the distal legs also grip the ground as well as the proximal legs, so the shopper can completely disengage the stepping stool from the shopping cart and use the stool independently. In this embodiment, the C-clamp features a sliding cover, or tab, which covers the C-clamp's aperture to allow its corresponding leg to function independently and support weight as if the distal legs had no clamps. In this embodiment, the sliding cover, or tab, would also comprise nonslip padding on its bottom surface to maintain appropriate friction to prevent slippage.

The stepping stool housing unit's undercarriage may also comprise a chamber of at least 5 liters in volume, sufficiently sized and shaped for the shopper to disengage the stool from the cart and use the stool, when inverted, as a carrying container (a "shopping bag") to hold grocery items. In this embodiment, the proximal and/or distal legs' bottoms comprise at least one handle for the shopper to hold while shopping.

The stepping stool's clamp may be tailored to fit the lower shelf of a supermarket, such that the stool may securely function to help shoppers reach "top shelf" items when disengaged from any shopping cart.

The step stool with a Velcro™ strap which fastens the stool to a shopping cart's rear end.

The step stool wherein each C-clamp also has a hinge for tilting the stool.

The stool wherein the housing unit undercarriage further comprises tracks to allow a shopper to roll to stool into the shopping cart.

The stool wherein the legs telescopically fold to shrink and expand.

The stool wherein the top planar platform is hinged to allow shoppers to roll items into the shopping cart.

The stool, wherein the proximal legs' bottom portion comprises a wheel caster mechanism to allow the invention, when disengaged from a shopping cart, to function as a rolling cart.

The invention claimed is:

1. A step stool for attachment to a shopping cart comprising:
   a planar platform, which is a nonslip padded mat comprising a top side and a bottom side, said mat's bottom side comprising a plurality of connecting plugs;
   a set of two front proximal legs connected to each other by an arched crossbar;
   a set of two rear distal legs connected to each other by a crossbar; and
   a housing unit comprising a recessed top tray region and a bottom undercarriage, said recessed top tray region accommodating said padded mat, said recessed top tray region further comprising a plurality of socket spaces to house said connecting plugs;
   wherein said bottom undercarriage comprises at least two channels for holding said rear distal legs and said front proximal legs when retracted into the housing unit, each of said undercarriage channels comprising a folding joint fastening mechanism to connect the undercarriage channels to their respective legs, wherein said joint fastening mechanism comprises at least one hinge, at least one hook, and at least one torsion spring which upon application of sufficient force, lift said legs into said housing unit;
   wherein each of said front proximal legs comprise a top portion and a bottom portion, each of said proximal legs' bottom portion comprising a nonslip stopper; and
   wherein at least one of said rear distal legs' bottom portion comprising a C-clamp with at least one aperture to hold a rear cross bar of the shopping cart around which said step stool is rotated, for collapsing the step stool into a folded configuration underneath a basket of the shopping cart.

2. The step stool of claim 1 wherein said C-clamp is a double-socket C-clamp, comprising a front aperture and a rear aperture, said front aperture being larger than said rear aperture.

3. The step stool of claim 1, said C-clamp further comprising an outer diameter and an inner diameter, wherein said inner diameter is lined with a plurality of teeth.

4. The step stool of claim 1, said C-clamp further comprising an outer diameter and an inner diameter, wherein said inner diameter is lined with a plurality of substantially square-shaped thermoplastic foam teeth.

5. The step stool of claim 1, said C-clamp further comprising an outer diameter and an inner diameter, wherein said inner diameter is lined with a plurality of substantially square-shaped polyurethane teeth.

6. The step stool of claim 1 wherein the proximal legs' arched cross bar is half-oval shaped, said cross bar having a shorter-radius between three inches and fourteen inches.

7. The step stool of claim 1, wherein said nonslip padded mat is comprised of rubber.

* * * * *